(12) United States Patent
Kakinada et al.

(10) Patent No.: US 10,701,608 B2
(45) Date of Patent: Jun. 30, 2020

(54) USE OF DYNAMIC CONNECTION PRIORITY INFORMATION TO CONTROL NETWORK CONNECTIVITY

(71) Applicant: Charter Communications Operating, LLC, St. Louis, MO (US)

(72) Inventors: Umamaheswar A. Kakinada, Centennial, CO (US); Maulik V. Vaidya, Denver, CO (US); Curt C. Wong, Bellevue, WA (US); Pratik Das, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 15/939,575

(22) Filed: Mar. 29, 2018

(65) Prior Publication Data
US 2019/0306773 A1 Oct. 3, 2019

(51) Int. Cl.
*H04W 36/26* (2009.01)
*H04W 36/14* (2009.01)
(Continued)

(52) U.S. Cl.
CPC ....... *H04W 36/26* (2013.01); *H04W 36/0022* (2013.01); *H04W 36/14* (2013.01);
(Continued)

(58) Field of Classification Search
CPC . H04W 72/0406; H04W 76/00; H04W 76/15; H04W 76/16; H04W 88/06; H04W 48/20
See application file for complete search history.

(56) References Cited

U.S. PATENT DOCUMENTS

2004/0185853 A1* 9/2004 Kim .................. H04W 36/0083
455/438
2007/0091849 A1* 4/2007 Park .................. H04W 36/0016
370/331
(Continued)

FOREIGN PATENT DOCUMENTS

WO WO 2009/045078 A2 4/2009
WO WO 2013/066060 A1 5/2013

OTHER PUBLICATIONS

International Search Report, PCT/US2019/022015, dated Jun. 11, 2019, pp. 17.

*Primary Examiner* — Kan Yuen
(74) *Attorney, Agent, or Firm* — Armis IP Law, LLC

(57) ABSTRACT

User equipment receives first connection priority information. In accordance with the first connection priority information, the mobile communication device establishes a first wireless communication link between the user equipment and a first wireless network to communicate first communications. A controller/management resource provides notification of second connection priority information to be used instead of the first connection priority information. In response to detecting a trigger event in which the user equipment is operated to communicate second communications, the user equipment uses the second connection priority information as a replacement to the first connection priority information to establish a second wireless communication link connecting the user equipment to the second network instead of the first network.

37 Claims, 10 Drawing Sheets

(51) Int. Cl.
  *H04W 72/10*   (2009.01)
  *H04W 36/00*   (2009.01)
  H04W 16/14    (2009.01)
  H04W 48/18    (2009.01)

(52) U.S. Cl.
  CPC ............ *H04W 72/10* (2013.01); *H04W 16/14* (2013.01); *H04W 48/18* (2013.01)

(56) References Cited

U.S. PATENT DOCUMENTS

| | | | |
|---|---|---|---|
| 2010/0113010 A1 | 5/2010 | Tenny et al. | |
| 2010/0173667 A1* | 7/2010 | Hui | H04W 88/06 455/552.1 |
| 2011/0081887 A1* | 4/2011 | Chakraborty | H04W 48/02 455/410 |
| 2011/0182272 A1* | 7/2011 | Santhanam | H04W 36/14 370/332 |
| 2011/0237257 A1* | 9/2011 | Soliman | H04W 36/165 455/436 |
| 2015/0119034 A1* | 4/2015 | Li | H04W 36/0022 455/435.2 |
| 2015/0381431 A1 | 12/2015 | Jung et al. | |
| 2016/0007240 A1 | 1/2016 | Belghoul et al. | |
| 2016/0174232 A1* | 6/2016 | Krishnamoorthy | H04W 24/08 455/436 |
| 2017/0048773 A1* | 2/2017 | Miao | H04W 8/183 |
| 2017/0048789 A1* | 2/2017 | Tan | H04W 36/30 |
| 2017/0094591 A1* | 3/2017 | Namboodiri | H04B 17/318 |
| 2017/0215083 A1* | 7/2017 | Kudo | H04W 16/14 |
| 2017/0332301 A1* | 11/2017 | Horn | H04W 36/18 |

* cited by examiner

USE OF DYNAMIC CONNECTION PRIORITY INFORMATION TO CONTROL NETWORK CONNECTIVITY

BACKGROUND

Conventional LTE (Long Term Evolution) cellular networks typically include a core network, a RAN (Radio Access Network), and one or more mobile communication devices (user equipment). The radio access network resides between user equipment (such as a mobile phone, a computer, or any remotely controlled machine) and provides connectivity with its core network (CN). As its name suggests, the radio access network provides respective user equipment access (such as Internet access) via the core network.

A wireless network can be configured to include macro cell and small cell resources to support both voice and data services to user equipment using a single subscription (e.g., one SIM profile). In certain instances, a macro radio layer is normally used to minimize signaling due to inter-cell handover as respective user equipment moves between cells.

In certain instances, LTE wireless networks are implemented using the CBRS (Citizens Band Radio System) band. Other LTE wireless networks use licensed frequency bands to provide wireless connectivity.

BRIEF DESCRIPTION OF EMBODIMENTS

There are deficiencies associated with conventional wireless networks. For example, conventional small cell networks such as those using the 3.5 GHz (such as CBRS) band or other band may be able to provide data services (such as non-voice communications) to subscribers. However, for any number of reasons, it may be undesirable to use small cell wireless networks to provide (occasionally needed) voice services to respective subscribers.

Embodiments herein provide novel ways of providing different types of communication services (data or non-voice communications, voice communications, etc.) to corresponding subscribers based on use of connection priority information.

More specifically, in one embodiment, a wireless network environment includes a first wireless network and a second wireless network. Assume that the first wireless network primarily supports data services (such as non-voice communications) while the second wireless network supports both data (non-voice) and/or voice services.

By further way of non-limiting example embodiment, the first wireless network can be a so-called small cell network supporting first wireless communications; the second wireless network can be a so-called macro cell network supporting second wireless communications. It may be preferred to provide non-voice communications over the first wireless network and voice communications over the second wireless network.

Assume further in this example that a base station in the first wireless network initially provides first wireless connectivity to user equipment operated by a respective subscriber. As mentioned, the first wireless network supports first wireless communications or data services such as non-voice communications. In one embodiment, a network management resource (such as associated with the first wireless network) provides user equipment first connection priority information to establish a first wireless communication link between the user equipment and the first wireless network. As previously discussed, in one embodiment, the first connection priority information is allocated to support conveyance of a first type of communications such as non-voice services that are less time sensitive.

Via use of the first connection priority information, the user equipment establishes a first wireless communication link with the first wireless network.

In response to detecting a trigger event (such as an attempt by the user equipment to establish a voice call) in which the user equipment is operated to communicate a second type of communications (such as voice communications), a communication management resource generates second connection priority information for use by the user equipment to establish a second wireless communication link. Thus, in one embodiment, the user equipment can be configured to receive the second connection priority information over the first wireless communication link from a resource such as the first network in response to a trigger condition in which a user of the user equipment intends to make a call including voice communications.

Alternative embodiments herein include communicating the second connection priority information to the user equipment in anticipation that the user equipment may initiate a voice call. In such an instance, if the user makes a voice call, the second connection priority information is already available to the user equipment.

The user equipment can be configured to receive notification of the second connection priority information from any suitable resource. In one embodiment, the communication management resource communicates the second connection priority information from the first wireless network over the first wireless communication link to the user equipment. Thus, in one embodiment, the user equipment receives notification of second connection priority information assigned to the user equipment, the second connection priority information indicating a priority of connecting to the second wireless network.

In accordance with further embodiments, the user equipment at least temporarily uses the second connection priority information as a replacement to the second connection priority information. Thus, in one embodiment, the second connection priority information is a temporary substitute to the first connection priority information.

The user equipment uses the second connection priority information (instead of the first connection priority information) to establish a second wireless communication link supporting the voice call. The second wireless communication link connects the user equipment to a base station in the second network. In one embodiment, the second connection priority information causes the user equipment to temporarily camp on the second wireless network instead of the first wireless network.

In accordance with further embodiments, in addition to receiving the second connection priority information, the user equipment can be configured to receive notification of expiration information associated with the second connection priority information. The expiration information controls a duration in which the user equipment is to use the second connection priority information instead of the first connection priority information for wireless connectivity. Subsequent to detecting expiration of the second connection priority information as specified by the expiration information, the user equipment reverts back to use of the first connection priority information to connect to or camp on the first network again.

In accordance with further embodiments, the first connection priority information can be configured to indicate that the first network is ranked higher in priority than the second network to support non-voice communications. The second connection priority information can be configured to indicate that the second network is ranked higher in priority than the first network to support voice communications.

In accordance with still further embodiments, the first connection priority information indicates frequency bands supported by the first network; the second connection priority information indicates frequency bands supported by the second network. The user equipment selects from the specified frequency bands to establish corresponding wireless communication links with the first wireless network and the second wireless network.

As a more specific example, in one embodiment, the user equipment can be configured to: i) select a frequency band specified by the second connection priority information, and ii) communicate a request to establish the second wireless communication link over the selected frequency band to initiate a new communication session.

As previously discussed, the first wireless network is operated by a first wireless network service provider; the second network can be operated by a second wireless network service provider. The first wireless network service provider and the second wireless network service provider can partner with each other to provide the user equipment different network access depending on a type of communications to be conveyed. For example, the first connection priority information can be configured to indicate carrier frequencies in the first wireless network provided by a first wireless network service provider. The carrier frequencies in the first connection priority information are assigned to support conveyance of non-voice communications in the first wireless network. The second connection priority information can be configured to indicate carrier frequencies in the second wireless network provided by a second wireless network service provider. The carrier frequencies in the second connection priority information are assigned to support conveyance of voice communications in the second wireless network.

Thus, user equipment initially may be provided network connectivity via the first wireless network. In one embodiment, in response to detecting a condition such as a desire to establish a voice communication session such as a phone call, the network management resource initiates a transfer of the user equipment from a small cell network (wireless network #1) to a macro cell network (wireless network #2). Upon termination of the voice session, the user equipment can be configured to wirelessly connect to (such as camp on) the first wireless network again.

In this manner, a subscriber may operate user equipment to establish wireless connectivity to a remote network such as the Internet via communications over the first wireless network (small cell network). In the event of a voice call, the user equipment switches over to use of the second connection priority information to establish a respective wireless with the second wireless network. Upon completion of the voice call, or expiration of the second connection priority information, the user equipment can be configured to switch back to using the first connection priority information to connect to or camp on the small cell network again.

In one embodiment, it may further be assumed that the first wireless network and the second wireless network are operated by independent service providers and are not interconnected through the standard 3GPP inter network connection interfaces such as S8 and corresponding signaling (such as between SGW and PGW) or S10 and corresponding signaling (such as between Mobile Management Entities (MME)s in each of the two networks). Thus, in one embodiment, the first wireless network and the second wireless network provide wireless connectivity to the user equipment absent being interconnected through standard 3GPP inter-network connection interfaces S8 and S10. The lack of such connectivity is mitigated by the enhancements in the current disclosure (such as use of connection priority information), which can be implemented in the application layer in the device and the serving small cell network (such as the first wireless network) operating in 3.5 GHz (CBRS) band. Thus, in one embodiment, implementation of using the second connection priority information occurs at an application layer of the user equipment and the first wireless network.

Embodiments herein are useful over conventional techniques of providing wireless network coverage. For example, a small cell network (such as wireless network #1) provides non-voice services to a respective subscriber. A macro cell network provides voice services (and/or data services) to the user equipment operated by the subscriber on an as-needed basis. As previously discussed, the distribution of second connection priority information causes the user equipment to camp (at least temporarily) on the second wireless network to support a voice session. The user equipment reverts back to camping on or connecting to the first wireless network subsequent to completion of the voice call. In such an instance, the primary wireless network provides a bulk of communication services to the user equipment while the secondary wireless network provides occasional use of higher-grade wireless services (such as communications requiring high level of quality, low latency, etc.) when needed.

These and other more specific additional embodiments are disclosed herein as further discussed below.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by computer processor hardware, cause the computer processor hardware (such as one or more co-located or disparately processor devices) to: in accordance with first connection priority information assigned for use by user equipment, establish a first wireless communication link between the user equipment and a first wireless network; receive notification of second connection priority information assigned to the user equipment, the second connection priority information indicating a priority of connecting to a second wireless network; and utilize the second connection priority information instead of the first connection priority information to establish a second wireless communication link, the second wireless communication link connecting the user equipment to the second network.

Another embodiment includes a computer readable storage medium and/or system having instructions stored thereon. The instructions, when executed by computer processor hardware, cause the computer processor hardware (such as one or more co-located or disparately processor devices) to: provide user equipment first connection priority information to establish a first wireless communication link between the user equipment and a first wireless network, the first connection priority information allocated to support conveyance of a first type of communications; establish the first wireless communication link between the first wireless network and the user equipment; and in response to detecting a trigger event in which the user equipment is operated to communicate a second type of communications, control the user equipment to establish a second wireless communication link via use of second connection priority information instead of the first connection priority information.

The ordering of the steps above has been added for clarity sake. Note that any of the processing steps as discussed herein can be performed in any suitable order. Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting different wireless services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
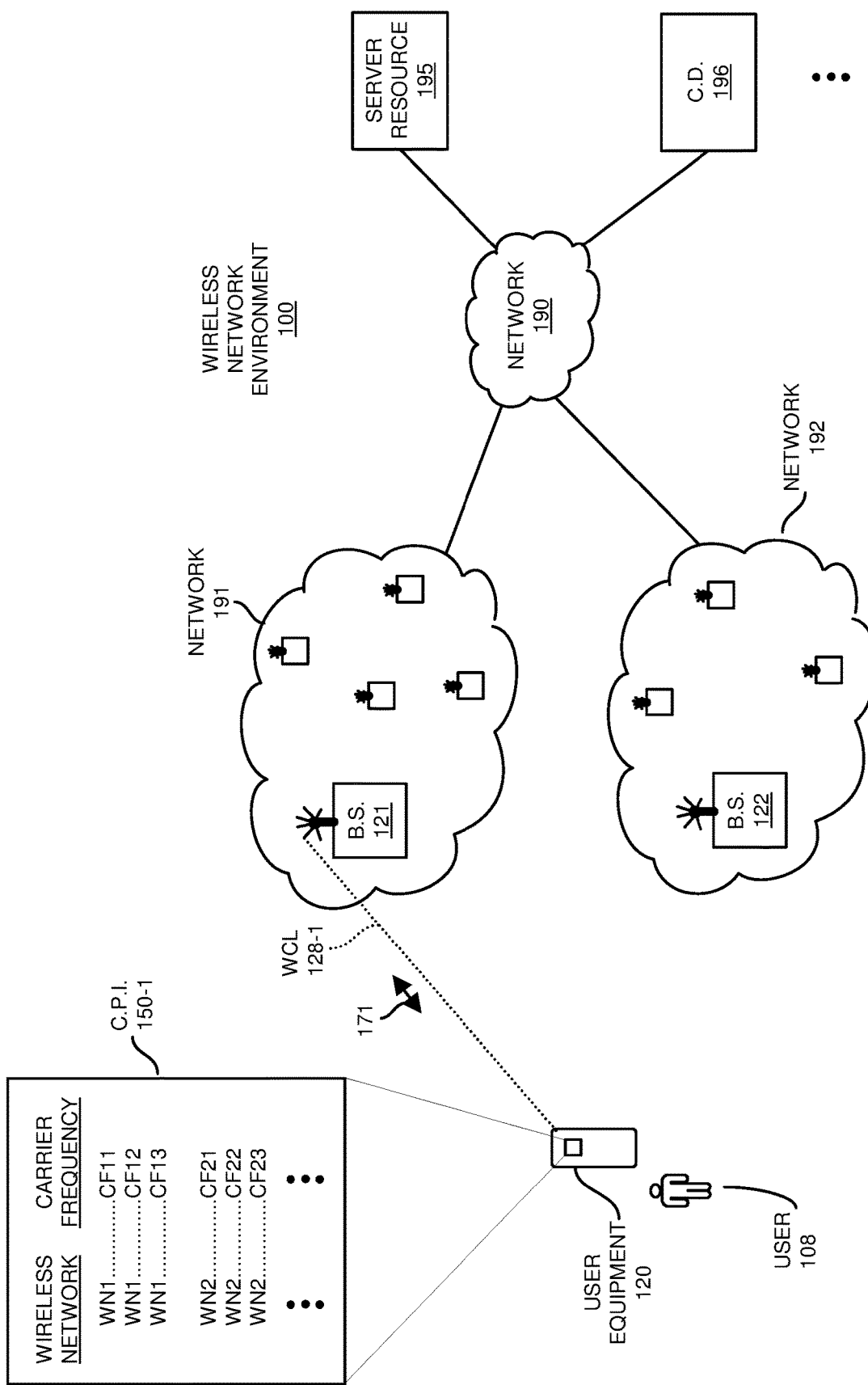
FIG. 1 is an example diagram illustrating connectivity of user equipment to a first wireless network according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, user equipment receives first connection priority information from a first network service provider. In accordance with first connection priority information, the mobile communication device establishes a first wireless communication link between the user equipment and a first wireless network (provided by the first network service provider) to communicate a first type of communications or first communication sessions. A controller/management resource generates second connection priority information to be used by the user equipment instead of the first connection priority information. In one embodiment, in response to detecting a trigger event in which the user equipment is operated to communicate a second type of communications or establish a second communication session, the user equipment uses the second connection priority information instead of the first connection priority information to establish a second wireless communication link connecting the user equipment to the second network (which is provided by a second service provider).

In response to a condition such as completion of the second communication session or expiration of a timer value associated with the replacement (second) connection priority information, the user equipment reverts back to camping on or using data services provided by the first wireless network again such as via use of the first connection priority information to reestablish the connectivity with the first wireless network again.

Accordingly, via distribution of connection priority information, a user operating the user equipment is able to use wireless communication services provided by a first wireless network service provider and temporarily switch to use of communication services provided by a second wireless network service provider in certain instances.

Now, more specifically, FIG. 1 is an example diagram illustrating a network environment including multiple wireless networks according to embodiments herein. As shown, wireless network environment 100 includes multiple wireless networks including wireless network 191 and wireless network 192. Wireless network 191 and wireless network 192 each support conveyance of any suitable type of one or more communications such as voice communications, non-voice communications, etc.

As further described herein, wireless network 191 includes network management hardware such as multiple base stations executing corresponding software to provide user equipment 120 (such as one or more mobile communication devices) connectivity to wireless network 191.

Wireless network 192 includes network management hardware such as multiple base stations executing corresponding software to provide connectivity to wireless network 192.

In one non-limiting example embodiment, the wireless network 191 is provided and/or operated by a first wireless network service provider. The wireless network 192 is provided and/or operated by a second wireless network service provider. The first wireless network service provider may pay fees on behalf of user 108 to the second wireless network service provider so that the user 108 is able to at least occasionally use wireless services provided by second wireless network service provider.

Thus, in accordance with subscription agreements between service providers, wireless network 191 can be configured to support conveyance of first wireless communications (such as data services) including non-voice communications. In such an instance, the non-voice communications supported by the first wireless network 191 are high latency data packets that are not time sensitive. In other words, it is acceptable that such data packets are delayed to some extent. If desired, the wireless network 191 can be configured to support voice communications and non-voice communications.

Wireless network 192 can be configured to support second wireless communications (such as voice services) including voice communications or other time sensitive data. Thus, in one embodiment, the voice communications supported by the second wireless network 192 are low latency data packets that are time sensitive. If desired, the wireless network 192 can be configured to support both voice communications and non-voice communications. In such an instance, the wireless network 192 can be a backup wireless network supporting communications in cases in which the first wireless network is unavailable. Accordingly, the user equipment 120, using whichever network is available, is able to transmit and receive data over network 190.

As previously discussed, each of the wireless networks 191 and 192 may support conveyance of voice communications and non-voice communications. However, in one embodiment, it should be noted that the subscriber such as user 108 and corresponding device (user) are biased towards connecting to (camping on) and using the first wireless network 191 instead of the second wireless network 192 whenever possible. As previously discussed, wireless network 192 may be useful to provide conveyance of lower latency transmissions for communication sessions conveying voice data. Communication of connection priority information to the user equipment 120 as further described herein facilitates connecting the user equipment 120 a desired wireless network.

As previously discussed, user equipment 120 (such as a mobile communication device, computer device, etc.) in the wireless network environment 100 can be configured to default back to (or camp on) wireless network #1 when possible. As further discussed below, user equipment 120 in wireless network environment 100 can be forced to use wireless network 192 and corresponding one or more base stations during conditions in which the respective user equipment 120 requests use of voice services such as to make or receive a phone call.

In accordance with further embodiments, note that wireless network 191 includes any number of base stations. In this example embodiment, the wireless network 191 includes base station 121, which is operable to provide connectivity to network 190 and target resources such as server resource 195, another communication device such as communication device 196, etc.

Wireless network 192 includes any number of base stations. In this example embodiment, the wireless network 192 includes at least base station 122, which is operable to provide connectivity to target resources such as server resource 195, communication device 196, etc., through network 190 in the event that the wireless network 191 is unable to do so or during times when the user 108 and/or corresponding user equipment 120 wishes to use the wireless network 192 instead of the wireless network 191.

Note that the wireless networks 191 and 192 can be configured to support any type of communications in accordance with a one or more suitable wireless communication protocols. In one embodiment, wireless network environment 100 and corresponding wireless networks 191 and 192 each support wireless communications such as based on 3G/HSPA (High Speed Packet Access), 4G/LTE (Long Term Evolution), 5G/NR (New Radio), etc. However, note that each of the wireless networks 191 and 192 can be configured to support wireless link communications in accordance with any suitable type of one or more communication protocols. Thus, in one embodiment, the wireless network 191 can be deployed in accordance with, for example, small cell using a 5G network architecture supporting LTE communications.

Additionally or alternatively, if desired, the base stations (such as base station 121 and others) in wireless network 191 can be configured to support communications via use of one or more carrier frequencies in the shared spectrum such as CBRS (Citizen Band Radio System) band.

In contrast, the set of one or more base stations (such as base station 122 and others) in the wireless network 192 can be configured to support wireless LTE or other communications via one or more carrier frequencies in a non-shared spectrum (such as a licensed band, non-CBRS band, etc.).

In such an instance, the base station 121 provides the user equipment 120 access to network 190 via the wireless communication link 128-1 (wireless connectivity) via one or more carrier frequencies in the CBRS (Citizens Band Radio System) spectrum. As further discussed herein, subsequent to redirection of the user equipment 120 to the wireless network 192, a respective base station such as base station base station 122 in wireless network 192 provides wireless connectivity over one or more carrier frequencies in the non-CBRS band (such as a licensed spectrum in which a second service provider provides wireless connectivity to the subscriber user 108 of the wireless network 192).

Further in this example embodiment, the user equipment 120 receives connection priority information 150-1 indicating availability of the different networks.

In one embodiment, the connection priority information 150-1 provided to user equipment 120 is a prioritized list of carrier frequencies to be used by the user equipment 120 to establish a respective wireless communication link 128-1 with an available network such as wireless network 191 and wireless network 192. As shown, the connection priority information 150-1 ranks carrier frequencies associated with wireless network 191 highest in the respective list. Via the ranking of carrier frequencies, the connection priority information 150-1 is biased towards providing the user equipment 120 connectivity to the wireless network 191 instead of wireless network 192.

Thus, when the user equipment 120 attempts to establish a respective wireless communication link or camp on a respective one of the multiple wireless networks 191 and 192, the user equipment 120 first uses the carrier frequencies assigned to wireless network 191 to connect to wireless network 191. In the event that wireless network 191 is unavailable for some reason, or that the first carrier frequencies CF11, CF12, CF13, etc., do not enable the user equipment 120 to connect to the wireless network 191, the user equipment 120 uses the carrier frequencies (such as carrier frequencies CF21, CF22, CF23, etc.) associated with wireless network 192 to establish a respective wireless communication link or camp on a respective wireless network 192.

Thus, based on agreements between service providers associated with the wireless network 191 (provided by a first service provider) and wireless network 192 (provided by a second service provider), and shared use of the wireless networks, the user equipment 120 is able to switch between connecting to the different networks depending upon network conditions. In other words, the user equipment 120 is able to access network 190 either through wireless network 191 or wireless network 192.

In circumstances when the primary wireless network 191 includes sufficient base stations and corresponding wireless coverage, wireless network 191 provides a bulk of communication services to the user equipment 120. The second wireless network 192 provides occasional use of higher-level of quality data flow services to convey data when such services are needed.

Further in this example embodiment, assume that, via use of the first connection priority information 150-1, the user equipment 120 establishes a first wireless communication link 128-1 with the first wireless network 191.

In one embodiment, establishing the wireless communication link 128-1 includes selecting a carrier frequency from the connection priority information 150-1. In one embodiment, the ranked carrier frequencies CF11, CF12, CF13, etc., as specified by the connection priority information 150-1 reside in the CBRS frequency band. Wireless network 191 and corresponding base stations can be configured to support LTE communications. The ranked carrier frequencies CF21, CF22, CF23, etc., reside in a non-CBRS frequency band (such as a licensed communication band. Wireless network 192 and corresponding base stations support LTE communications.

In this instance, assume that the user equipment 120 selects carrier frequency CF11 and communicates a request to establish the wireless communication link 128-1. If the user equipment 120 is unable to use the selected carrier frequency CF11 to connect to the wireless network 191, the user equipment 120 attempts to connect with wireless network 191 using carrier frequency CF12. The user equipment 120 repeats the process until the user 108 is able to connect to the respective wireless network 191.

Subsequent to establishing the wireless communication link 128-1, the user 108 and corresponding user equipment 120 use the wireless communication link 128-1 to access network 190. The respective communication session over wireless communication link 128-1 supports retrieval of less time sensitive content such as email, video content, web pages, etc.

Figure 2:
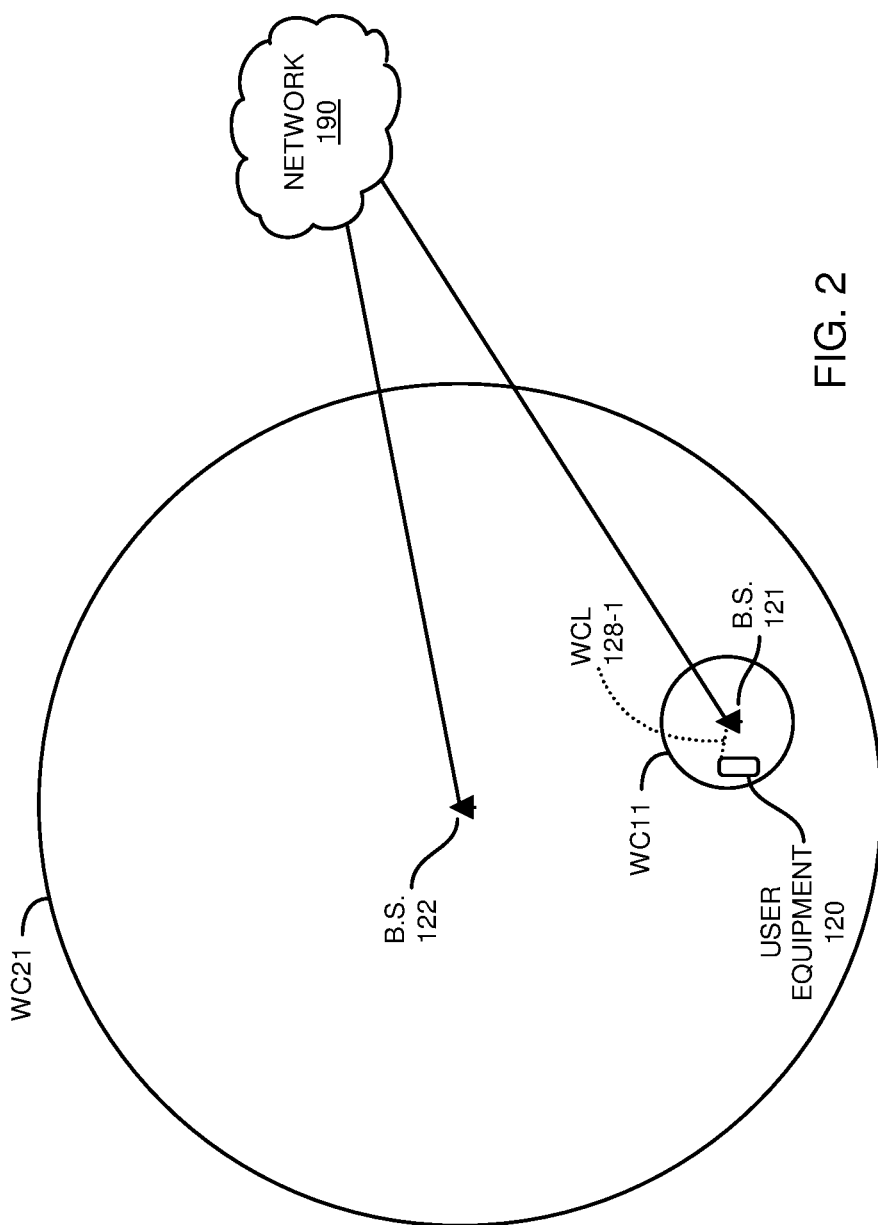
FIG. 2 is an example diagram illustrating wireless coverage provided by a base station in a first wireless network and a wireless coverage provided by a base station in a second wireless network according to embodiments herein.

FIG. 2 is an example diagram illustrating base station and corresponding wireless coverage provided by multiple wireless networks according to embodiments herein.

As shown in FIG. 2, by way of non-limiting example embodiment, wireless network 191 (WN1) and corresponding base stations including base station 121 can be so-called small cell base stations allocated to support first wireless communications (data services) such as non-voice communications. In such an embodiment, base station 121 supports wireless coverage WC11 to corresponding user equipment.

Wireless network 192 and corresponding base stations including base station 122 can be so-called macro cell base stations allocated to support second wireless communications such as at least voice communications. In this example embodiment, base station 122 supports wireless coverage WC21. The wireless coverage WC11 is substantially smaller in size than wireless coverage WC21 provided by base station 122.

As previously discussed, based on service agreements, the second type of wireless communications (such as voice communications or voice services) may not be supported by wireless network 191 or it may be less desirable to make voice calls over the wireless network 191. In one embodiment, to make an outbound call or receive an inbound call, the user equipment 120 and corresponding subscriber (such as user 108) may be required to or configured to use communication services provided by wireless network 192.

As previously discussed, in one example embodiment, the first wireless communications supported by wireless network 191 are short-range wireless communications. Wireless network 191 includes any number of base stations. Such short-range base stations can be low-powered cellular radio access nodes that operate in licensed and/or unlicensed spectrum (such as CBRS band) that support a range such as between 5 meters to a distance up to 5 kilometers, although the base stations in wireless network 191 can be configured to support any distance.

In one embodiment, each of the long-range base stations such as base stations in wireless network 192 provide at least twice the amount of wireless coverage than the short-range base stations in the wireless network 191. Each macro cell in wireless network 192 can be configured to provide any suitable RF power output such as on the order of tens of watts.

Note that the coverage provided by the base stations in each of the wireless network 191 and wireless network 192 as discussed above are shown by way of non-limiting example embodiment. In accordance with further embodiments, the wireless coverage (or distance supported) by the base station 121 in wireless network 191 and wireless network 192 can be of any size. In other words, as previously discussed, wireless network 191 may be a small cell network and wireless network 192 may be a macro cell network. However, both wireless network 191 and wireless network 192 may be small cell networks or large cell networks.

Note that that configuration of the wireless network 191 as a small cell network and configuration of wireless network 192 as a macro cell network may be desirable in cases where an excessive number of handoffs are undesirable in a small cell network in which a respective user must switch from one cell to another due to a high rate of mobility. Use of a macro-cell base stations (as opposed to small cell base stations) reduces handoffs because long-range base stations support long-range wireless coverage to respective user equipment 120.

Figure 3:
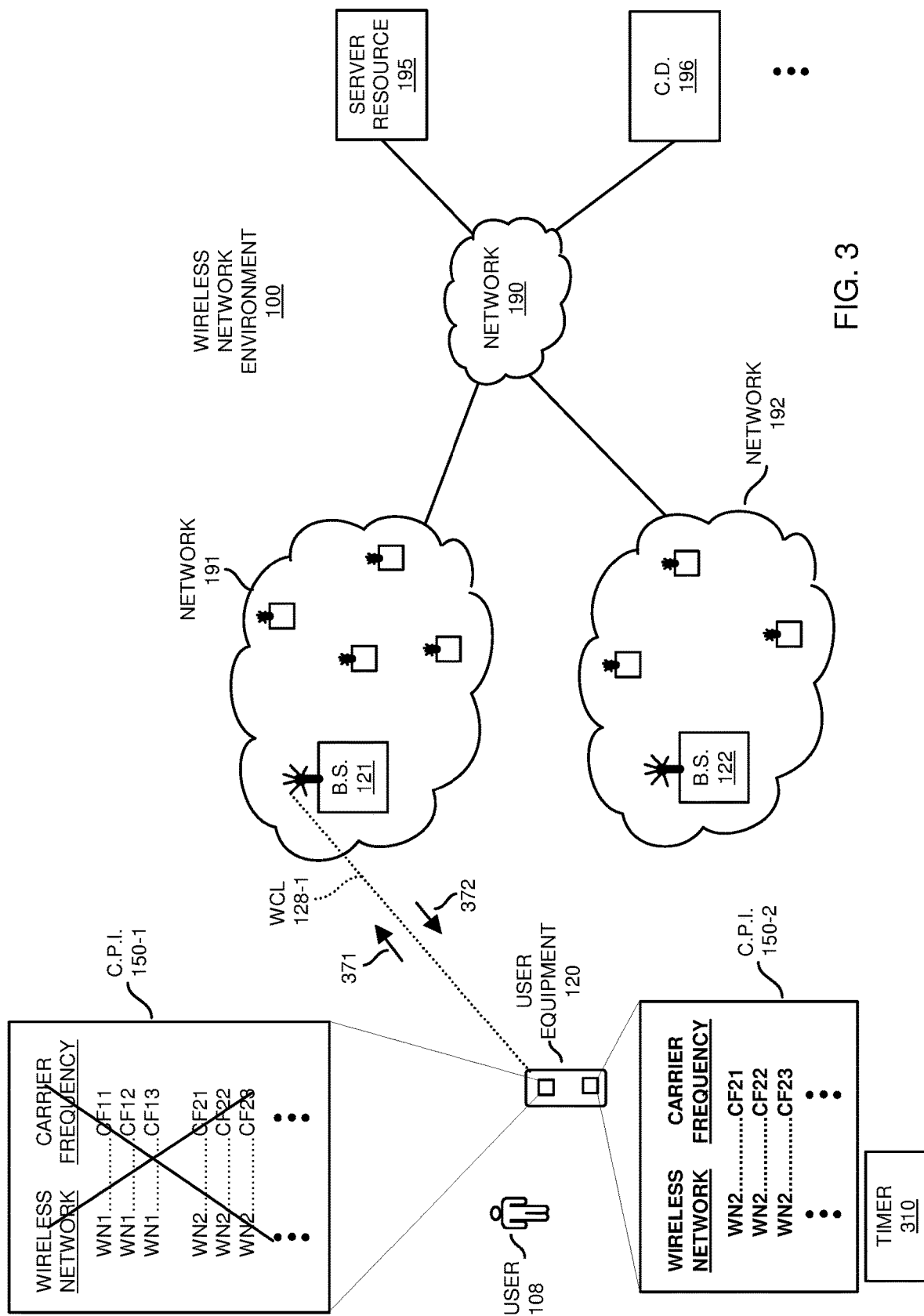
FIG. 3 is an example diagram illustrating detection of a new session by user equipment and notification of replacement of connection priority information according to embodiments herein.

FIG. 3 is an example diagram illustrating detection of a new session by user equipment and notification of replacement connection priority information according to embodiments herein.

As previously discussed, the user 108 initially uses the wireless communication link 128-1 to support a first communication session.

Assume that the user 108 initiates a voice call (such as via a voice command inputted to the user equipment 120, touching key pads of the user equipment 120, etc.) to a target recipient such as communication device 196. In one embodiment, initiation of the new communication session (voice call) causes the user equipment 120 to convey messages 371 over communication link 128-1 to the base station 121 in wireless network 191.

Via messages 371, the base station 121 and corresponding wireless network 191 are informed of the attempt by user equipment 120 to establish the new communication session (such as voice call to communication device 196).

In response to detecting this trigger event (such as an attempt by the user 108 operating the user equipment 120 to establish a new communication session such as a voice call) in which the user equipment 120 is operated to communicate a second type of communications (such as voice communications), a communication management resource associated with base station 121 or other suitable resource generates second connection priority information 150-2 for use by the user equipment to establish a second wireless communication link.

The user equipment 120 can be configured to receive the connection priority information 150-2 from any suitable resource. In one embodiment, the base station 121 communicates the connection priority information 150-2 in communications 372 to user equipment 120 over wireless communication link 128-1 in response to detecting the trigger event (new communication session).

Thus, in one embodiment, the user equipment 120 can be configured to receive the second connection priority information 150-2 over the first wireless communication link 128-1 from a resource such as the first network 191 in response to a trigger condition in which a user of the user equipment 120 intends to make a call including voice communications.

As an alternative to receiving the connection priority information 150-2 from a management resource associated with wireless network 191, the user equipment 120 can be configured to receive notification of the second connection priority information 150-2 from any suitable resource.

In this example embodiment, the connection priority information 150-2 indicates a different ranking of corresponding carrier frequencies available to access a respective wireless network. For example, connection priority information 150-2 indicates that carrier frequency bands CF21, CF22, CF23, etc., are ranked highest in the listing to establish a respective wireless communication link.

Thus, in accordance with embodiments herein, the first connection priority information 150-1 can be configured to indicate that the first network 191 (and its corresponding assigned carrier frequencies) is ranked higher in priority than the second network 192 to support non-voice communications. The second connection priority information 150-2 can be configured to indicate that the second wireless network 192 is ranked higher in priority than the first wireless network 191 to support voice communications.

As further shown in this example embodiment, the user equipment 120 at least temporarily uses the first connection priority information 150-2 as a replacement to the first connection priority information 150-1. Thus, in one embodiment, the second connection priority information 150-2 is a temporary substitute to the first connection priority information 150-1.

Note that in addition to receiving the second connection priority information 150-2 (via communications 372) to support the newly requested communication session, the user equipment 120 can be configured to receive notification of expiration information associated with the second connection priority information 150-2. The expiration information (such as a time value received in communication 372) controls a duration in which the user equipment 120 is to use the second connection priority information 150-2 instead of the first connection priority information 150-1.

In other words, in one embodiment, the connection priority information 150-2 is only temporary information for use by the user equipment 120 to cause the user equipment 120 to connect to or camp on the second wireless network 192 to establish the new communication session.

In accordance with further embodiments, user equipment 120 includes a timer 310. Upon receiving a time value (such as equal to 30 seconds) along with the connection priority information 150-2, the user equipment 120 loads the timer 310 with the received time value. Subsequent to detecting expiration (that is, passing of a duration of 30 seconds of time as specified by the received time value) of the second connection priority information 150-2 as specified by the expiration information, the user equipment 120 reverts back to use of the first connection priority information 150-1 (or other received connection priority information) to bias the user equipment 120 to connect to (or camp on) the first wireless network 191 again. The timer 310 can be configured to start counting time upon receiving the time value or other specified time.

Note that the time value used by timer 310 can be sufficiently long in duration to enable the user equipment 120 to establish a second wireless communication link 128-2 with the wireless network 192 as indicated in the following figures. As further discussed below, subsequent to passage of an amount of time as specified by the received time value, the user equipment 120 reverts back to use of the connection priority information 150-1 to establish connectivity.

Figure 4:
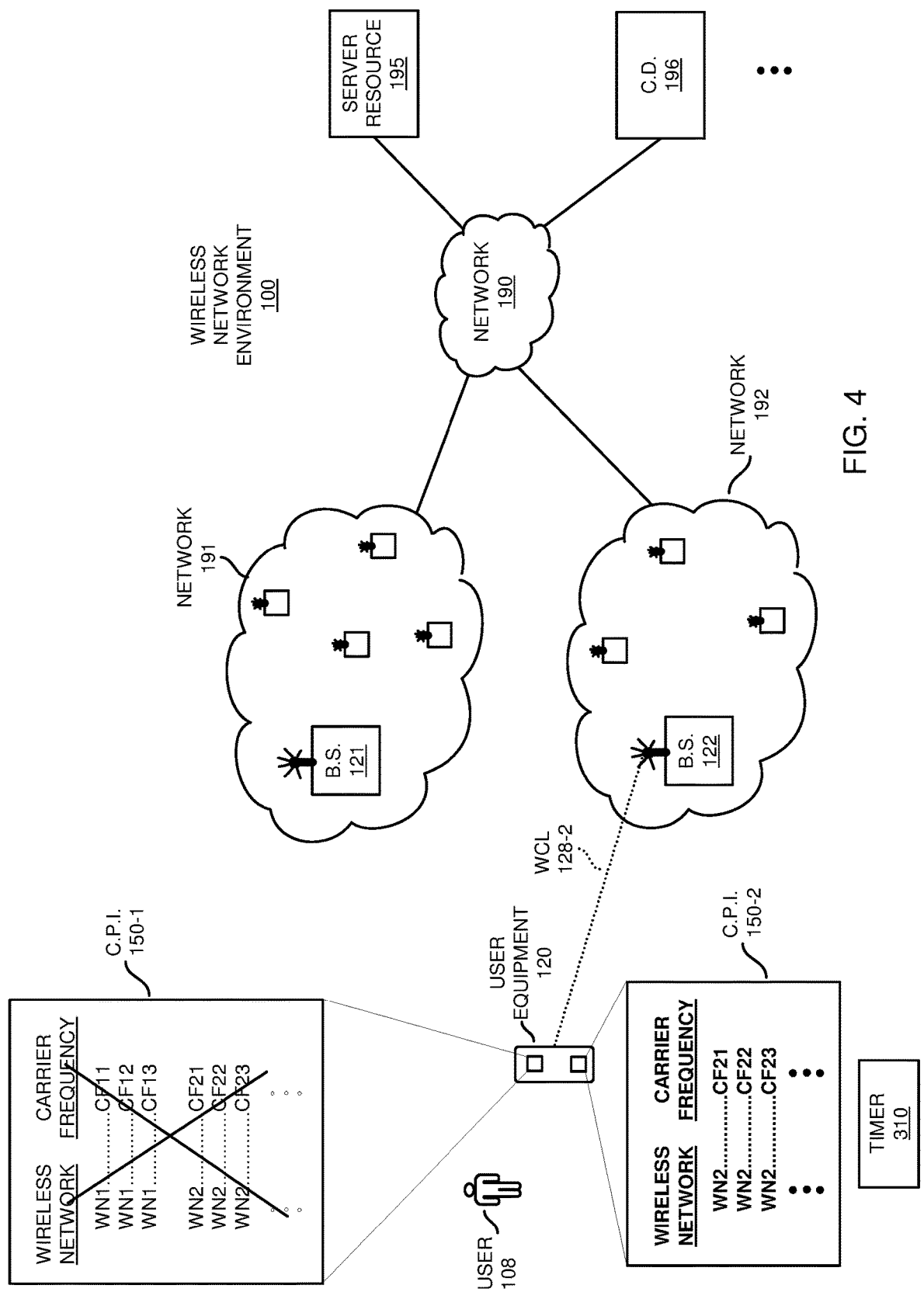
FIG. 4 is an example diagram illustrating use of replacement connection priority information to establish a respective wireless communication link with a second wireless network according to embodiments herein.

FIG. 4 is an example diagram illustrating use of replacement connection priority information to establish a respective wireless communication link with a second wireless network according to embodiments herein.

As shown, the user equipment 120 uses the second connection priority information 150-2 (instead of the first connection priority information 150-1) to establish a second wireless communication link 128-2 supporting the newly requested communication session (voice call to communication device 196).

For example, to establish the new communication session, the user equipment 120 accesses the connection priority information 150-2 to identify one or more carrier frequencies in which to establish the wireless communication link 128-2. Based on the ranking of carrier frequencies, the user equipment 120 initially selects the carrier frequency CF21 (highest ranked carrier frequency) to establish the wireless communication link 128-2. If the user equipment 120 is unsuccessful using the first carrier frequency CF21 to establish the wireless communication link 128-2, the user equipment 120 attempts to establish the wireless communication link 128-2 using the second carrier frequency CF22. The user equipment 120 continues use of the different ranked carrier frequencies until it is able to establish the wireless communication link 120-2 with the base station 122 in wireless network 192.

Subsequent to establishing the second wireless communication link 128-2, the second wireless communication link 128-2 connects the user equipment 120 to network 190 through base station 122 of the second wireless network 192. Thus, in one embodiment, the second connection priority information 150-2 causes the user equipment 120 to at least temporarily camp on or connect to the second wireless network 192 instead of the first wireless network 191.

As previously discussed, the first wireless network 191 can be provided and operated by a first wireless network service provider; the second network 192 can be provided and operated by a second wireless network service provider. The first wireless network service provider and the second wireless network service provider can partner with each other to provide the user equipment 120 different network access through network 190 depending on a type of communications to be conveyed. For example, as previously discussed, the first connection priority information 150-1 can be configured to indicate carrier frequencies in the first wireless network 191 provided by a first wireless network service provider. In one embodiment, the carrier frequencies in the first connection priority information 150-1 are assigned to support conveyance of non-voice communications in the first wireless network 191. The second connection priority information 150-2 can be configured to indicate carrier frequencies in the second wireless network 192 provided by a second wireless network service provider. In this example embodiment, the carrier frequencies and/or carrier frequency bands (such as CF21, CF22, CF23, etc.) in the second connection priority information 150-2 are assigned to support conveyance of voice communications in the second wireless network 192.

Subsequent to establishing the wireless communication link 128-2, user equipment 120 is able to communicate with (receive communications from and transmit communications to) the corresponding communication device 196 over wireless communication link 128-2.

Figure 5:
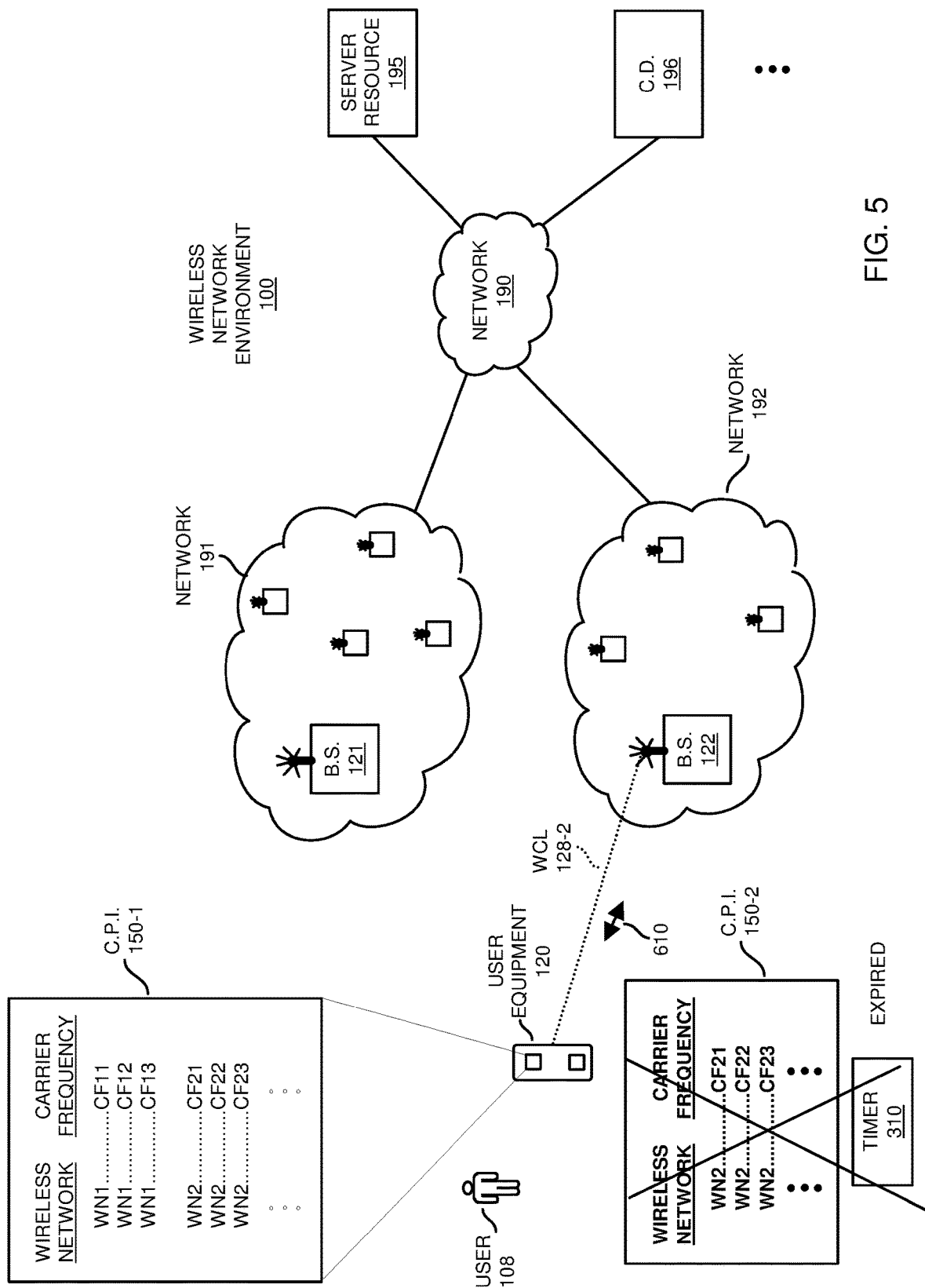
FIG. 5 is an example diagram illustrating expiration of the replacement connection priority information according to embodiments herein.

FIG. 5 is an example diagram illustrating expiration of the replacement connection priority information according to embodiments herein.

As previously discussed, the user equipment 120 is able to communicate with (receive communications from and transmit communications to) the corresponding communication device 196 over the wireless communication link 128-2.

In one embodiment, while the user 108 communicates with the respective communication device 196 over the wireless communication link 128-2, the duration of time in which the (temporary) connection priority information 150-2 is valid may expire. Expiration causes the user equipment 120 to revert back to using connection priority information 150-1 to establish any new non-voice communication sessions. However, the user equipment 120 is able to continue to communicate with (receive communications from and transmit communications to) the corresponding communication device 196 over the wireless communication link 128-2 even though the connection priority information 150-1 replaces the connection priority information 150-2 as the active connection priority information to be used by the user equipment 120.

Figure 6:
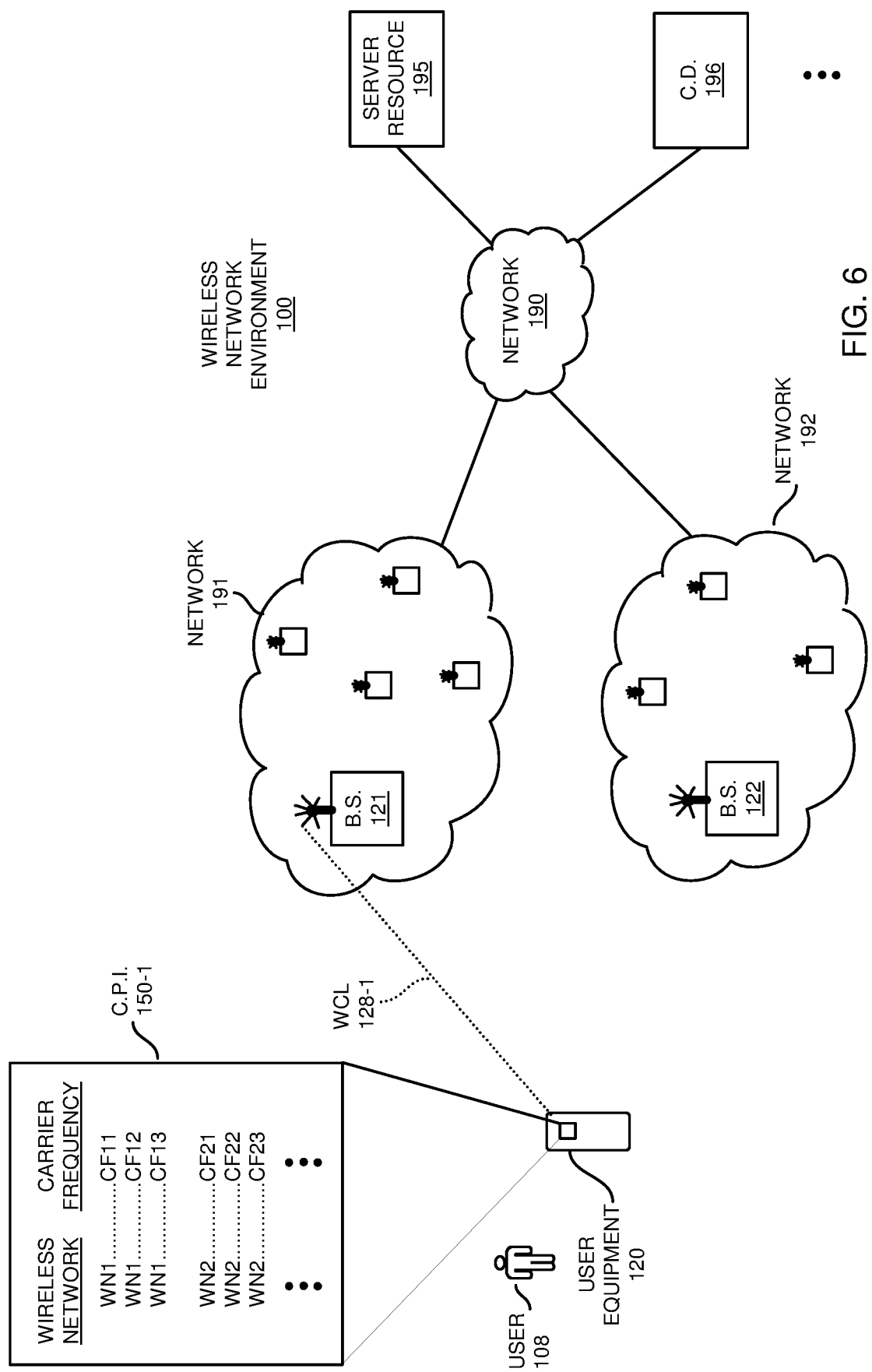
FIG. 6 is an example diagram illustrating camping of user equipment back on the first wireless network subsequent to termination of a prior communication session with the second wireless network according to embodiments herein.

As further shown in FIG. 6, upon termination of the voice session over wireless communication link 128-2, the user equipment 120 can be configured to wirelessly connect to (such as camp on) the first wireless network 191 again.

FIG. 6 is an example diagram illustrating camping of user equipment on the first wireless network subsequent to termination of a prior communication session with the second wireless network according to embodiments herein.

Assume that the user 108 ends the (voice) communication session with the communication device 196 over wireless communication link 128-2. In such an instance, in response to a trigger condition such as detecting the termination of the respective voice communication session, the user equipment 120 uses the connection priority information 150-1 to establish a respective connection again with wireless network 191.

In one embodiment, establishing the wireless communication link 128-3 includes selecting a carrier frequency from the connection priority information 150-1. In this instance, assume that the user equipment 120 selects carrier frequency CF11 (highest ranked carrier frequency) and communicates a request to establish the wireless communication link 128-1 such as over the carrier frequency CF11. If the user equipment 120 is unable to use the selected carrier frequency CF11 to connect to the wireless network 191, the user equipment 120 attempts to connect with wireless network 191 via carrier frequency CF12. The user equipment 120 repeats the process until the user is able to connect to the respective wireless network 191 based on the ranking of carrier frequencies as specified by the connection priority information 150-1.

Subsequent to establishing the wireless communication link 128-3 using a selected carrier frequency, the user 108 and corresponding user equipment 120 use the wireless communication link 128-3 to access network 190. The respective communication session over wireless communication link 128-3 supports retrieval of content such as email, video content, web pages, etc.

Thus, a subscriber (user 108) may operate user equipment to establish wireless connectivity to a remote network 190 such as the Internet via communications over the first wireless communication link 128-1 to the wireless network 191. In the event of a new communication session, the user equipment 120 switches over to use of the second connection priority information 150-2 to establish a respective wireless link 128-2 with the second wireless network 192. Upon completion of the new communication session, or expiration of the second connection priority information 150-2, the user equipment 120 can be configured to switch back to using the first connection priority information 150-1 to connect to or camp on the wireless network 191.

Embodiments herein are useful over conventional techniques of providing wireless network coverage. For example, the first wireless network 191 provides first wireless connectivity to the user equipment 120. Wireless network 192 provides wireless services (voice and/or data services) to the user equipment 120 operated by the user 108 (subscriber) on an as-needed basis such as when the wireless network 191 is unavailable or when the wireless network 192 is needed to provide a certain level of quality of wireless communications that is not available by the first wireless network 191.

Figure 7:
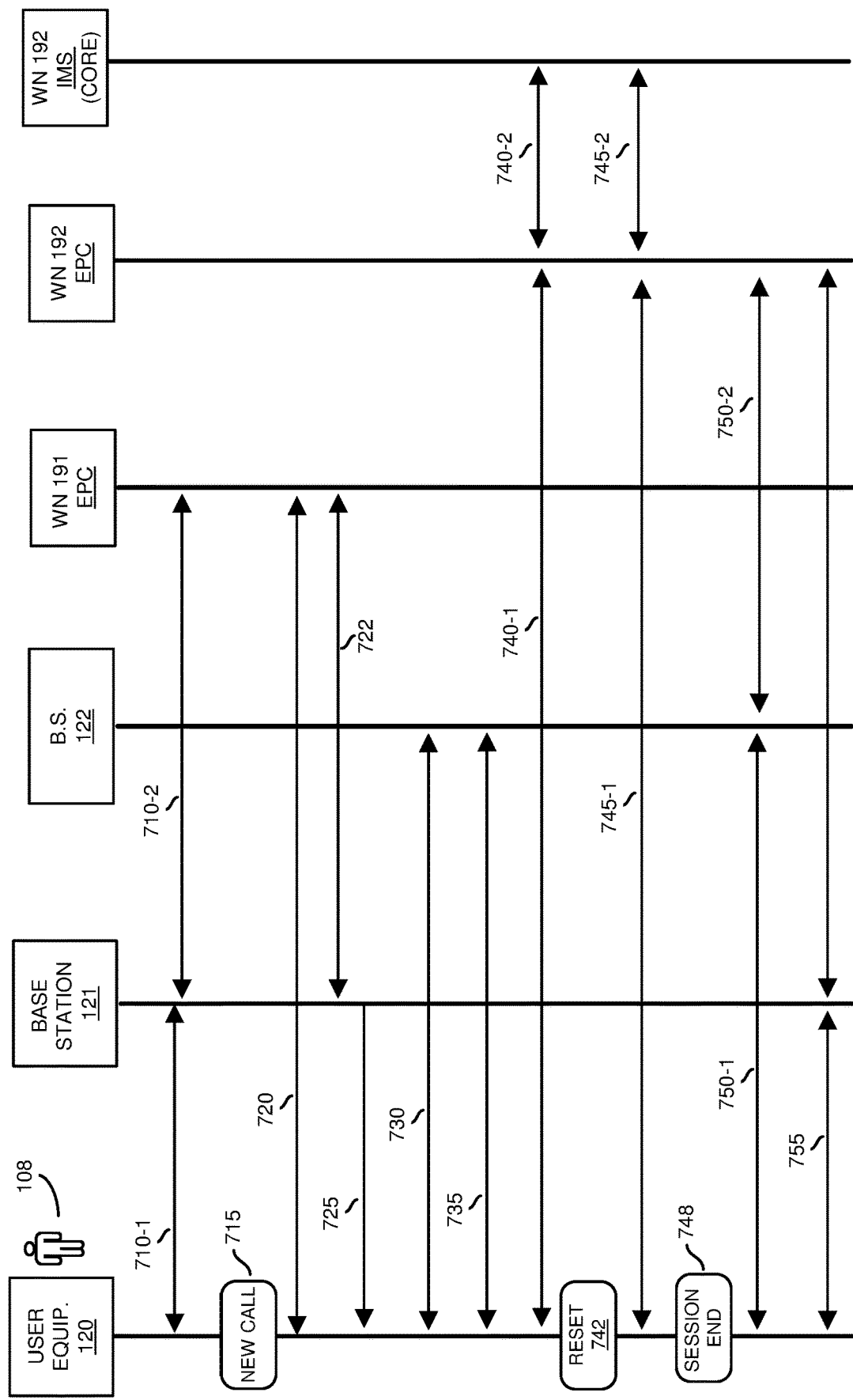
FIG. 7 is an example timing-diagram illustrating communications amongst different network resources according to embodiments herein.

FIG. 7 is an example detailed timing-diagram illustrating communications amongst network resources according to embodiments herein.

In one embodiment, subscriber data (to provide wireless network connectivity) associated with user 108 operating user equipment 120 is provisioned in both wireless network 191 and wireless network 192. In one embodiment, signaling S9 is available.

In this example embodiment, via communications 710-1 between user equipment 108 and base station 121, and communications 710-2 between base station 121 and EPC (Evolved Packet Core) of wireless network 191, the user equipment 120 attaches to (such as wirelessly connects to or camps on) the first wireless network (base station 120-1) such as via standard 3GPP communications. As previously discussed, via wireless communication link 128-1, the user equipment 120 is able to communicate through remote network 190 via non-voice communications (such as a data session to retrieve web pages, emails, etc.).

At operation 715, assume that the user 108 of user equipment 120 initiates a voice call via appropriate input (such as a request to establish a voice call or new communication session of a particular type) to the user equipment 120. In one embodiment, when the user equipment 120 attempts to establish the new communication session such as establish a new voice call to a target recipient, the EPC of wireless network 191 detects the corresponding condition such as via sampling a traffic pattern and messages associated with communications 720 from the user equipment 120.

In response to detecting the new communication session attempt (such as new voice call request inputted to the user equipment 120 by user 108 at operation 715), a resource such as a MME (Mobile Management Entity) in wireless network 191 indicates a preferred band (such as indicated by connection priority information 150-2) for the given user equipment 120 over S1-AP messaging, such as using the Subscriber Profile ID for RAT/Frequency priority IE in the UE Context Modification Request.

Via communications 722, from the EPC of wireless network 191 to base station 121, the wireless network 191 notifies the base station 121 (such as eNB) of the user equipment context modification and connection priority change via S1 signaling.

Via further communications 725 from base station 121 to the user equipment 120, the user equipment 120 is released from the wireless network 191 (CBRS network). In one embodiment, the release notification to the user equipment 120 indicates that a cause of the release as being "other." In other words, in one non-limiting example embodiment, the cause of the release in communications to the user equipment 120 can be set to a value such as "other." Additionally, the user equipment specific prioritized band information (such as connection priority information 150-2) is signaled to the user equipment 120 by the wireless network 191 (CBRS network) in an RRC_Connection_Release message from base station 121 (such as eNB) to user equipment 120.

In accordance with further embodiments, the RRC_Connection_Release message from the base station 121 to the user equipment 108 also sets the timer 310 of the user equipment 120 (LTE T320 timer) to a predetermined time value such as a minimum allowed value. The base station 121 (eNB) indicates to the user equipment 120 cell reselection priorities (such as via connection priority information 150-2) in the idle_mode_mobility_control_information within the RRC connection release message. In one embodiment, this connection priority (as indicated by the connection priority information 150-2) is aligned with the carrier frequency band(s) of the second wireless network 192 (MNO partner network). Thus, communication of the connection priority information 150-2 is intended to cause the user equipment 120 to connect to or camp on the second wireless network 192 (MNO network). Via communications 730 between the user equipment 120 and the base station 122 associated with wireless network 192, based on the connection priority information 150-2, the user equipment 120 camps on the wireless network 192.

Via further communications 735, the connection priority information 150-2 (newly re-prioritized band information) causes the user equipment 120 to connect to, through base station 122 and over communication link 128-2, the wireless network 192 (partner MNO network), due to reprioritized band (connection priority information 150-2) and equivalent PLMN (Public Land Mobile Network) relationship between the first service provider associated with wireless network 191 and second service provider associated with wireless network 192. Thus, in one embodiment, via communications 735, the user equipment 120 creates wireless communication link 128-2 to the base station 122 (MNO network) using the temporarily reprioritized band (connection priority information 150-2) associated with wireless network 192 and initiates a voice call over the wireless network 192 (MNO network) such as using the standard 3GPP procedures/messages.

Via communications 740-1 and 740-2, and appropriate signaling, the user equipment 120 establishes a voice session over communication 128-2 with a target device through the base station 122 of the second wireless network 192 (such as MNO infrastructure including MNO RAN, Core, and IMS network).

In operation 742, in one embodiment, when the user equipment 120 is connected to a recipient via the wireless network 192 over wireless communication link 128-2, the temporary band prioritization (connection priority information 150-2) is reset based on expiration of the time value. In one embodiment, this causes the user equipment 120 to revert back to use of the connection priority information 150-1 (default band prioritization).

In accordance with further embodiments, the reversion or reset from connection priority information 150-2 back to connection priority information 150-1 can be configured to occur upon on expiration of a time value (using T320 timer to track elapsed time) set by the wireless network 191 (CBRS network) and base station 121 (eNB) in the RRC-_Connection_Release message to the user equipment 120 via communications 725. Thus, after a predetermined amount of time as indicated by the received time value, the user equipment 120 reverts back using connection priority information 150-1. The user equipment 120 continues the communication session with the target device even though the time value expires.

Via communications 745-1 and 745-2, the user equipment 120 eventually terminates the respective voice session with the target device.

In operation 748, the user equipment 120 detects the call termination (call end). The user equipment 120 can detect the termination of the newly established communication session network in any suitable manner. For example, the user equipment 120 can be configured to detect the call completion at an application layer (SIP by messages or voice dialer application).

When the user equipment 120 detects completion of the voice call (such as via an SIP Bye), the user equipment 120 initiates a detachment from wireless network 192 (partner MNO network—MNO RAN and EPC) via communication 750-1 and 750-2.

Via communications 755, the detached user equipment 120 gets into idle mode and is already set to its default band priority (such as back to connection priority information 150-1), which causes the user equipment 120 to camp back on or connect to the wireless network 191 (CBRS network).

In one embodiment, all messages used to accomplish a task of steering the user equipment 120 from the wireless network 191 (CBRS network) to the second wireless network 192 (MNO partner network) for supporting the new voice call are standard 3GPP messages intended for a different purpose, but are executed in a unique sequence as discussed herein. In such an instance, no protocol stack changes are needed in user equipment 120 or network. Also, in one embodiment, no proprietary messages are needed to implement the above operations. Changes needed to implement embodiments herein are minimal in user equipment 120 and network and are at an application level and network policy level.

In accordance with further embodiments, there is no network connectivity between the wireless network 191 (CBRS network) and wireless network 192 (partner MNO network) via signaling (S5/S8/S10). In accordance with still further embodiments, the subscriber data shall be available in wireless network 191 (CBRS network) and wireless network 192 (MNO partner network) through provisioning it in both networks, or through S9 connectivity between the two networks.

Thus, in one embodiment, it may further be assumed that the first wireless network 191 and the second wireless network 192 are operated by independent service providers and are not interconnected through the standard 3GPP inter network connection interfaces such as S8 and S10. This lack of such connectivity is mitigated by the techniques in the current disclosure. For example, techniques of using replacement connection priority information as discussed herein can be implemented in an application layer of respective user equipment 120 and the serving small cell network (such as the first wireless network 191) operating in 3.5 GHz band.

Figure 8:
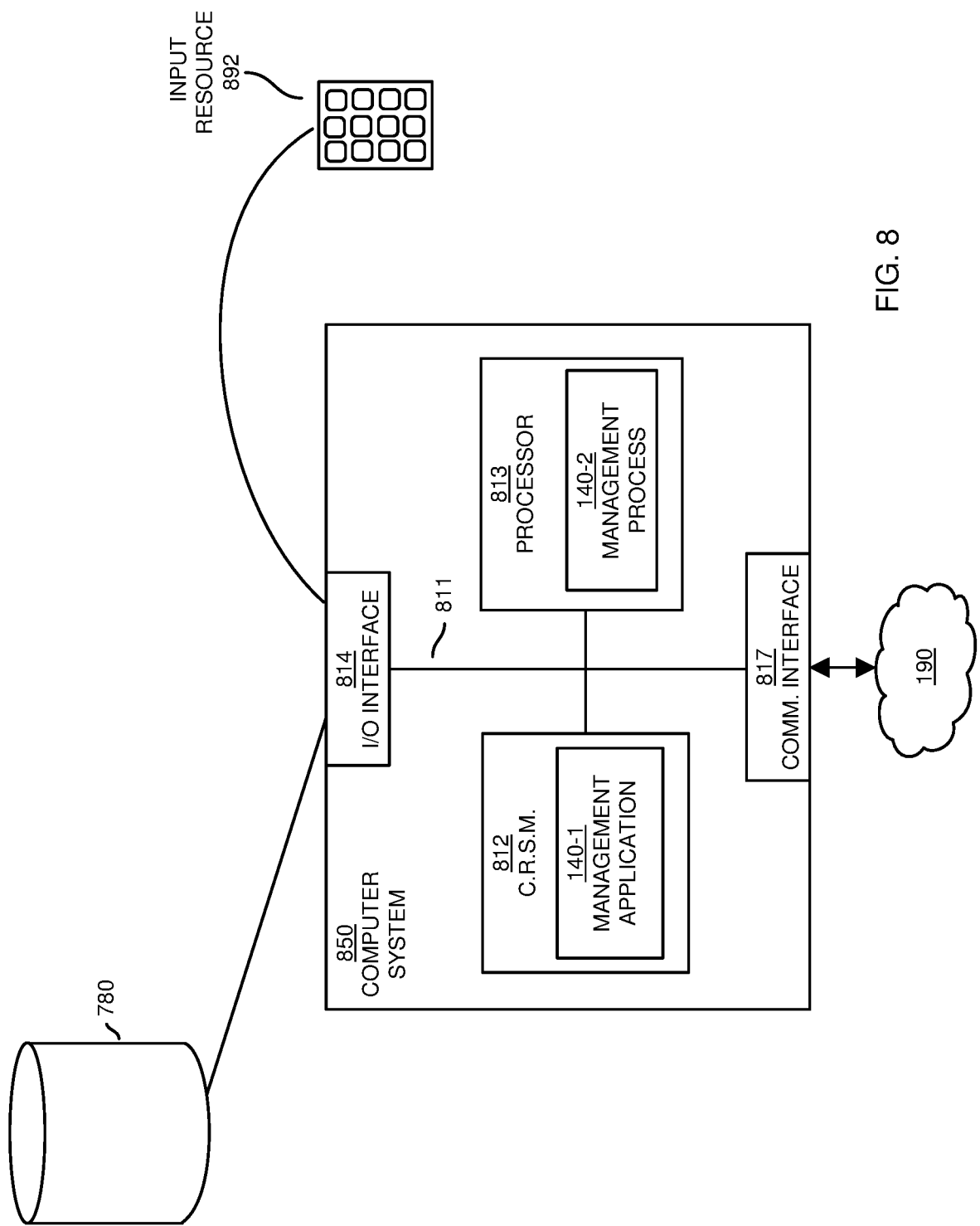
FIG. 8 is a diagram illustrating example computer architecture to execute one or more operations according to embodiments herein.

FIG. 8 is an example block diagram of a computer system for implementing any of the operations as discussed herein according to embodiments herein.

Any of the resources (such as base station 121, base station 122, user equipment 120, etc.) as discussed herein can be configured to include computer processor hardware and corresponding executable instructions to carry out the different operations as discussed herein. An instantiation of management application 140-1 resides in any of one or more of the resources such as base station 121, base station 122, user equipment 120, etc.

As shown, computer system 850 of the present example can include an interconnect 811 that couples computer readable storage media 812 such as a non-transitory type of media (such as a type of hardware storage medium) in which digital information can be stored and retrieved, a processor 813, I/O interface 814, and a communications interface 817.

I/O interface 814 supports connectivity to repository 880 and input resource 892.

Computer readable storage medium 812 can be any hardware storage device such as memory, optical storage, hard drive, floppy disk, etc. In one embodiment, the computer readable storage medium 812 stores instructions and/ or data.

As shown, computer readable storage media 812 can be encoded with management application 140-1 (e.g., including instructions) to carry out any of the operations as discussed herein.

During operation of one embodiment, processor 813 accesses computer readable storage media 812 via the use of interconnect 811 in order to launch, run, execute, interpret or otherwise perform the instructions in network management application 140-1 stored on computer readable storage medium 812. Execution of the network management application 140-1 produces network management process 140-2 to carry out any of the operations and/or processes as discussed herein.

Those skilled in the art will understand that the computer system 850 can include other processes and/or software and hardware components, such as an operating system that controls allocation and use of hardware resources to network management application 140-1.

In accordance with different embodiments, note that computer system may be or included in any of various types of devices, including, but not limited to, a mobile computer, user equipment, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIGS. 9-10. Note that the steps in the flowcharts below can be executed in any suitable order.

Figure 9:
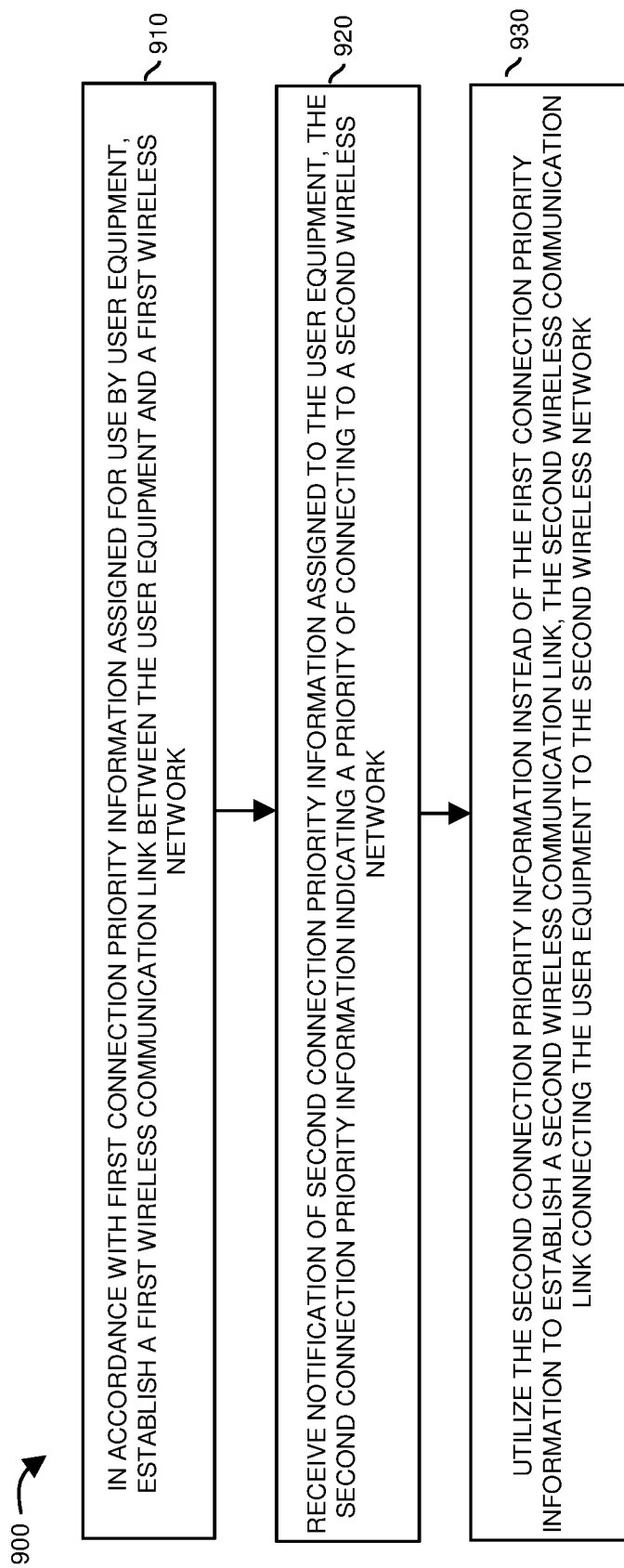
FIGS. 9 and 10 are example diagrams illustrating methods according to embodiments herein.

FIG. 9 is a flowchart 900 illustrating an example method according to embodiments. Note that there will be some overlap with respect to concepts as discussed above.

In processing operation 910, in accordance with first connection priority information 150-1 assigned for use by user equipment 120, the user equipment 120 (such as executing management application 140-1) establishes a first wireless communication link 128-1 between the user equipment 120 and the base station 121 in the first wireless network 191.

In processing operation 920, the user equipment 120 receives notification of second connection priority information 150-2 assigned to the user equipment 120. The second connection priority information 150-2 indicates a priority of connecting to the second wireless network 192.

In processing operation 930, the user equipment 120 utilizes the second connection priority information 150-2 instead of or as a replacement to the first connection priority information 150-1 to establish a second wireless communication link 128-2. The second wireless communication link 128-2 temporarily and wirelessly connects the user equipment 120 to the base station 122 of the second wireless network 192.

Figure 10:
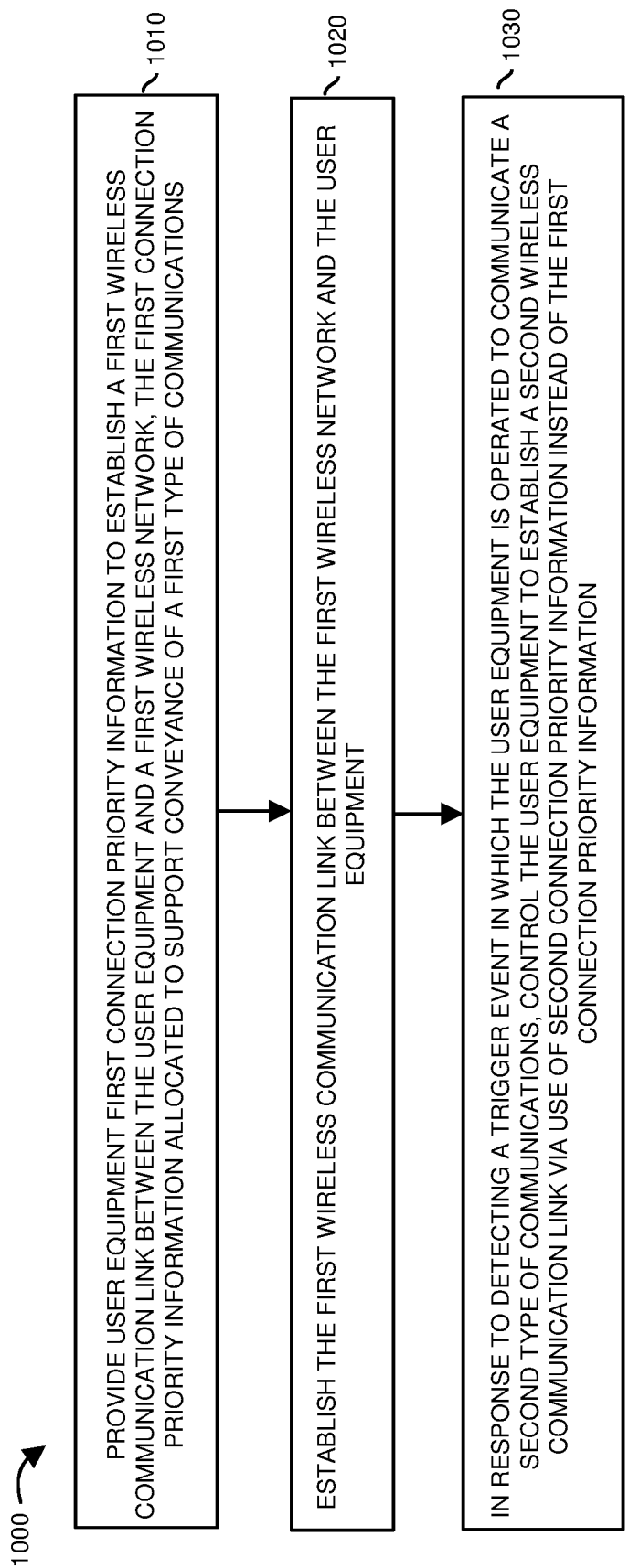

FIG. 10 is a flowchart 1000 illustrating an example method according to embodiments. Note that there will be some overlap with respect to concepts as discussed above.

In processing operation 1010, the base station 121 or other suitable resource (such as management application 140-1) provides user equipment 120 first connection priority information 150-1 to establish a first wireless communication link 128-1 between the user equipment 120 and a first wireless network 191. In one embodiment, the first connection priority information 150-1 is allocated to the user equipment 120 to support conveyance of a first type of communications such as non-voice communications in wireless network 191.

In processing operation 1020, the base station 121 establishes the first wireless communication link 128-1 between the first wireless network 191 and the user equipment 120.

In processing operation 1030, in response to detecting a trigger event in which the user equipment 120 is operated to communicate a second type of communications (such as voice communications in which a user 108 of the user equipment 108 makes a phone call), the base station 121 or other suitable resource communicates the connection priority information 150-2 to the user equipment 108. The connection priority information 150-2 controls the user equipment 120 to establish a second wireless communication link 128-2 via use of second connection priority information 150-2 instead of the first connection priority information 150-1.

Note again that techniques herein are well suited to facilitate connectivity to different networks. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   in accordance with first connection priority information assigned for use by user equipment, establishing a first wireless communication link between the user equipment and a first wireless network, the first connection priority information indicating first wireless carrier frequencies;
   receiving notification of second connection priority information assigned to the user equipment, the second connection priority information indicating a priority of connecting to a second wireless network, the second connection priority information indicating second wireless carrier frequencies; and
   utilizing the second connection priority information as a replacement to the first connection priority information to establish a second wireless communication link, the second wireless communication link connecting the user equipment to the second wireless network;
   wherein utilizing the second connection priority information to establish the second wireless communication link includes:
   at the user equipment: i) selecting a frequency band specified by the second connection priority information, and ii) communicating a request to establish the second wireless communication link over the selected frequency band.

2. The method as in claim 1 further comprising:
   receiving expiration information controlling a duration in which the user equipment is to use the second connection priority information instead of the first connection priority information.

3. The method as in claim 1, wherein the first connection priority information indicates that the first wireless network is ranked higher in priority than the second wireless network to support non-voice communications.

4. The method as in claim 1, wherein the second connection priority information indicates that the second wireless network is ranked higher in priority than the first wireless network to support voice communications.

5. The method as in claim 1, wherein receiving the notification of second connection priority information assigned to the user equipment includes:
   receiving a communication from the first wireless network, the communication including the second connection priority information.

6. The method as in claim 1 further comprising:
   receiving the second connection priority information over the first wireless communication link from the first wireless network in response to a condition in which a user of the user equipment intends to make a call including voice communications.

7. The method as in claim 1, wherein the first wireless network is operated by a first wireless network service provider; and
wherein the second wireless network is operated by a second wireless network service provider, the first wireless network service provider and the second wireless network service provider partnering to provide the user equipment different network access depending on a type of communications to be conveyed.

8. The method as in claim 1, wherein the first connection priority information indicates carrier frequencies assigned to support conveyance of non-voice communications; and
wherein the second connection priority information indicates carrier frequencies assigned to support conveyance of voice communications.

9. The method as in claim 1, wherein the second connection priority information causes the user equipment to temporarily camp on the second wireless network instead of the first wireless network.

10. The method as in claim 1, wherein the first wireless network and the second wireless network provide wireless connectivity to the user equipment absent being interconnected through standard 3GPP inter-network connection interfaces S8 and SW.

11. The method as in claim 1, wherein implementation of the second connection priority information occurs at an application layer of the user equipment and the first wireless network.

12. The method as in claim 1, wherein the second connection priority information includes identities of multiple carrier frequencies, the first connection priority information also including the identities of the multiple carrier frequencies.

13. The method as in claim 1, wherein the first connection priority information indicates the second wireless carrier frequencies.

14. The method as in claim 13, wherein the first wireless carrier frequencies in the first connection priority information are ranked higher than the second wireless carrier frequencies in the first connection priority information.

15. The method as in claim 1, wherein the first wireless carrier frequencies in the first connection priority information are ranked from highest priority to lowest priority to establish a connection; and
wherein the second wireless carrier frequencies in the second connection priority information are ranked from highest priority to lowest priority to establish the connection.

16. The method as in claim 15, wherein the first connection priority information indicates that the first wireless network is ranked higher in priority than the second wireless network to support non-voice communications; and
wherein the second connection priority information indicates that the second wireless network is ranked higher in priority than the first wireless network to support voice communications.

17. The method as in claim 1, wherein the first wireless carrier frequencies in the first connection priority information are ranked from highest priority to lowest priority; and
wherein the second wireless carrier frequencies in the second connection priority information are ranked from highest priority to lowest priority.

18. The method as in claim 1, wherein the first wireless network supports a first region of wireless coverage in a network environment;
wherein the second wireless network supports a second region of wireless coverage in the network environment; and
wherein the first region of wireless coverage resides within the second region of wireless coverage.

19. The method as in claim 18, wherein the second region of wireless coverage is substantially larger than the first region of wireless coverage.

20. The method as in claim 1, wherein the first wireless carrier frequencies fall in a non-licensed radio band; and
wherein the second wireless carrier frequencies fall in a licensed radio band.

21. The method as in claim 1 further comprising:
receiving the second connection priority information in a connection release message received over the first wireless network.

22. The method as in claim 1 further comprising:
receiving the second connection priority information over a wireless communication link between the user equipment and the first wireless network.

23. The method as in claim 1 further comprising:
receiving the second connection priority information in a connection release message, the connection release message indicating to terminate the first wireless communication link between the user equipment and the first wireless network.

24. The method as in claim 23 further comprising:
receiving the connection release message from the first wireless network over the first wireless communication link.

25. The method as in claim 23, wherein the connection release message includes a time value indicating a duration in which the second connection priority information replaces the first connection priority information.

26. The method as in claim 1, wherein the second connection priority information causes the user equipment to camp on the second wireless network.

27. A system comprising:
a first wireless network to provide user equipment connectivity to a remote network; and
the user equipment operable to: in accordance with first connection priority information assigned for use by the user equipment, establish a first wireless communication link between the user equipment and the first wireless network, the first connection priority information indicating first wireless carrier frequencies;
receive notification of second connection priority information assigned to the user equipment, the second connection priority information indicating a priority of connecting to a second wireless network, the second connection priority information indicating second wireless carrier frequencies; and
utilize the second connection priority information instead of the first connection priority information to establish a second wireless communication link, the second wireless communication link connecting the user equipment to the second wireless network; and
wherein, to establish the second wireless communication link, the user equipment is further operative to: i) select a frequency band specified by the second connection priority information, and ii) communicate a request to establish the second wireless communication link over the selected frequency band.

28. The system as in claim 27, wherein the user equipment is further operable to: receive expiration information controlling a duration in which the user equipment is to use the second connection priority information instead of the first connection priority information.

29. The system as in claim 27, wherein the first connection priority information indicates that the first wireless network is ranked higher in priority than the second wireless network to support non-voice communications.

30. The system as in claim 27, wherein the second connection priority information indicates that the second wireless network is ranked higher in priority than the first wireless network to support voice communications.

31. The system as in claim 27, wherein the user equipment is further operable to: receive a communication from the first wireless network, the communication including the second connection priority information to be used instead of the first connection priority information.

32. The system as in claim 27, wherein the user equipment is further operable to:
   use the second connection priority information over the first wireless communication link from the first wireless network in response to a condition in which a user of the user equipment intends to make a call requiring voice communications.

33. The system as in claim 27, wherein the first wireless network is operated by a first wireless network service provider; and
   wherein the second wireless network is operated by a second wireless network service provider, the first wireless network service provider and the second wireless network service provider partnering to provide the user equipment different network access depending on a type of communications to be conveyed.

34. The system as in claim 27, wherein the first connection priority information indicates carrier frequencies assigned to support conveyance of non-voice communications; and
   wherein the second connection priority information indicates carrier frequencies assigned to support conveyance of voice communications.

35. A system comprising:
   a first wireless network to provide user equipment connectivity to a remote network; and
   the user equipment operable to:
      in accordance with first connection priority information assigned for use by user equipment, establish a first wireless communication link between the user equipment and the first wireless network, the first connection priority information indicating first wireless carrier frequencies;
      receive notification of second connection priority information assigned to the user equipment, the second connection priority information indicating a priority of connecting to a second wireless network, the second connection priority information indicating second wireless carrier frequencies;
      utilize the second connection priority information instead of the first connection priority information to establish a second wireless communication link, the second wireless communication link connecting the user equipment to the second wireless network;
   wherein the user equipment is further operable to use the second connection priority information as a temporary substitute to the first connection priority information; and
   wherein the user equipment is further operable to: receive expiration information controlling a duration in which the user equipment is to use the second connection priority information instead of the first connection priority information; and use the first connection priority information subsequent to detecting expiration of the duration.

36. Computer-readable storage hardware having instructions stored thereon, the instructions, when carried out by computer processor hardware, cause the computer processor hardware to:
   in accordance with first connection priority information assigned for use by user equipment, establish a first wireless communication link between the user equipment and a first wireless network, the first connection priority information indicating first wireless carrier frequencies;
   receive notification of second connection priority information assigned to the user equipment, the second connection priority information indicating a priority of connecting to a second wireless network, the second connection priority information indicating second wireless carrier frequencies; and
   utilize the second connection priority information as a replacement to the first connection priority information to establish a second wireless communication link, the second wireless communication link connecting the user equipment to the second wireless network;
   at the user equipment, via the second connection priority information used to establish the second wireless communication link: i) select a frequency band specified by the second connection priority information, and ii) communicate a request to establish the second wireless communication link over the selected frequency band.

37. A method comprising:
   in accordance with first connection priority information assigned for use by user equipment, establishing a first wireless communication link between the user equipment and a first wireless network, the first connection priority information indicating first wireless carrier frequencies;
   receiving notification of second connection priority information assigned to the user equipment, the second connection priority information indicating a priority of connecting to a second wireless network, the second connection priority information indicating second wireless carrier frequencies; and
   utilizing the second connection priority information as a replacement to the first connection priority information to establish a second wireless communication link, the second wireless communication link connecting the user equipment to the second wireless network;
   wherein utilizing the second connection priority information includes, via the user equipment, utilizing the second connection priority information as a temporary substitute to the first connection priority information, the method further comprising:
   receiving expiration information controlling a duration in which the user equipment is to use the second connection priority information instead of the first connection priority information; and
   utilizing the first connection priority information subsequent to detecting expiration of the duration as indicated by the expiration information.

\* \* \* \* \*

UNITED STATES PATENT AND TRADEMARK OFFICE
CERTIFICATE OF CORRECTION

PATENT NO. : 10,701,608 B2
APPLICATION NO. : 15/939575
DATED : June 30, 2020
INVENTOR(S) : Umamaheswar A. Kakinada et al.

Page 1 of 1

It is certified that error appears in the above-identified patent and that said Letters Patent is hereby corrected as shown below:

In the Claims

Column 21, Line 26 delete "SW" and insert --S10--.

Signed and Sealed this
Eleventh Day of August, 2020

Andrei Iancu
*Director of the United States Patent and Trademark Office*